United States Patent [19]

Chopieska

[11] 3,836,052
[45] Sept. 17, 1974

[54] MARKER LINE MEANS FOR SPREADER

[76] Inventor: Frank S. Chopieska, 903 Lakeview Dr., LaCrosse, Wis. 54601

[22] Filed: Sept. 13, 1972

[21] Appl. No.: 288,574

[52] U.S. Cl. ............................................ 222/177
[51] Int. Cl. ........................................... A01c 15/12
[58] Field of Search ........ 222/177, 136, 1; 239/503, 239/507, 513–515, 521, 666

[56] References Cited
UNITED STATES PATENTS

| | | | |
|---|---|---|---|
| 2,630,945 | 3/1953 | Gandrud | 222/177 |
| 2,778,535 | 1/1957 | Seltzer | 222/177 X |
| 3,198,383 | 8/1965 | Brown | 222/1 |

Primary Examiner—Stanley H. Tollberg
Attorney, Agent, or Firm—Thomas F. Kirby

[57] ABSTRACT

A spreader for granular materials such as fertilizer, weed killer, or seed comprises a downwardly tapered bin having a row of adjustable apertures at the bottom of the bin and a bladed impeller in the bin above the apertures fixed to a shaft driven by the spreader wheels to force material through the apertures as the impeller rotates. A divider partition is mounted in the bin transverse to the impeller axis to divide the bin into a large compartment for the material to be spread and a small compartment for marking material such as powdered limestone. The divider partition is provided with a hole to accommodate the impeller. Sealing means are provided on the impeller to close the hole in the divider partition. An adjustably movable guide chute is attached on the outside of the bin to guide the flow of marking material.

6 Claims, 7 Drawing Figures

MARKER LINE MEANS FOR SPREADER

BACKGROUND OF THE INVENTION

1. Field of Use

This invention relates generally to apparatus for spreading granular fertilizers, weed killers, grass seed and like materials. In particular it relates to means in such spreader apparatus for providing a marker line alongside the row of material being spread.

2. Description of the Prior Art

The prior art discloses spreaders for granular materials such as fertilizers, weed killers, lawn seed or the like which comprise a downwardly tapered bin having a row of adjustable outlet holes or apertures at the bottom of the bin and a bladed impeller in the bin above the apertures fixed to a shaft driven by the spreader wheels to force the granular material through the apertures as the impeller rotates. U.S. Pat. No. 3,198,383 issued Aug. 3, 1965 to L. R. Brown for "Marking Spreader" discloses such a spreader having a separating panel for dividing the bin into a large compartment for the material being spread and into a smaller end compartment for a visible marking material such as finely ground limestone which is to be dispensed alongside the row of material being spread to mark the path of the spreader. The separating panel disclosed in the aforesaid patent is provided with either a slot type opening large enough to accommodate the bladed impeller or a smaller opening large enough for the impeller shaft, provided the impeller blades are slotted so as to clear the separating partition. Powdered limestone normally used as the marking material in such spreaders is much heavier than commercial fertilizers, such as 10-10-10 or "Millorganite", and very much heavier than seed. Consequently, if the opening in the panel between the compartments for the marking material and the fertilizer or seed is not sealed, the two materials will tend to be mixed together. This is because the area of the small outlet holes at the bottom of the marking bin is far smaller than the area of the hole for the bladed impeller. Since the impeller blades forcing marking material downward to the outlet holes cannot discharge it fast enough, if follows the path of least resistance and is forced into the fertilizer or seeder bin through the opening at the bottom of the partition. This changes the composition of the fertilizer or the amount of seed being spread.

SUMMARY OF THE INVENTION

A spreader for granular materials such as fertilizer, weed killer, or seed comprises a downwardly tapered bin having a row of adjustable apertures at the bottom of the bin and a bladed impeller in the bin above the bladed impeller is fixed to shaft driven by the spreader wheels to force material through the apertures as the impeller rotates. A divider partition is mounted in the bin transverse to the impeller axis to divide the bin into a large compartment for the material to be spread and a small compartment for marking material such as powdered limestone. The divider partition is provided with a hole to accommodate the impeller. Sealing means are provided on the impeller to close the hole in the divider partition. An adjustably movable guide chute is attached on the outside of the bin to guide the flow of marking material and may be swung into or out of operating position.

In accordance with one embodiment of the invention, the divider partition comprises a single piece of sheet metal, preferably flanged, and welded, riveted, screwed, or otherwise secured (as by adhesives) to the inside of the bin during manufacture. In accordance with another embodiment, the divider partition comprises two separate overlapping pieces of sheet metal releasably secured together by a nut and bolt so as to be adapted to fit inside the bin of an existing spreader.

The sealing means for substantially closing the hole in the partition comprise a circular sealing disc mounted on the impeller and having a first portion of slightly less diameter than the partition hole and a second portion or flange of slightly greater diameter than the partition hole so as to provide a double seal. In accordance with one embodiment of the invention, the sealing disc is a one-piece member, fabricated of metal, plastic or close-grained hardwood, and rigidly or rotatably mounted on the impeller shaft during manufacture in a space between two separate impeller sections. In accordance with another aspect of the invention, the sealing disc may be a multi-segmented member with each segment secured between adjacent pairs of impeller blades by suitable means, being attached either during manufacture or on an existing spreader.

A spreader having marker line means in accordance with the invention provides a more clearly defined marker line and prevents mixture of the marking material with the material being spread which results in dilution and uneven application of the material being spread. Furthermore, the invention may be easily embodied in spreaders during the manufacture thereof or readily applied as a kit to a variety of types and sizes of existing spreaders. Also, the invention is easy and economical to fabricate and reliable in use. Other objects and advantages of the invention will hereinafter appear.

DRAWINGS

DESCRIPTION OF PREFERRED EMBODIMENTS

Figure 1:
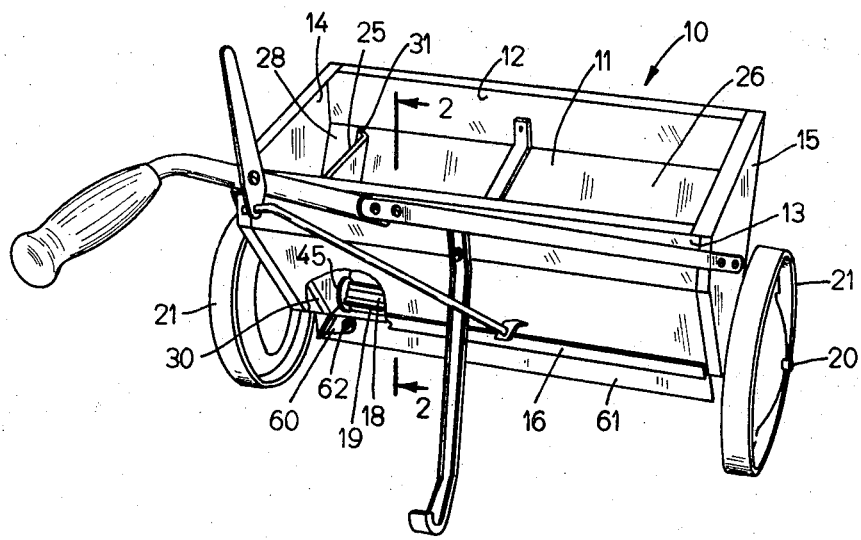
FIG. 1 is an isometric view of the rear of a spreader in accordance with one embodiment of the invention, with portions broken away to show interior details.
Figure 2:
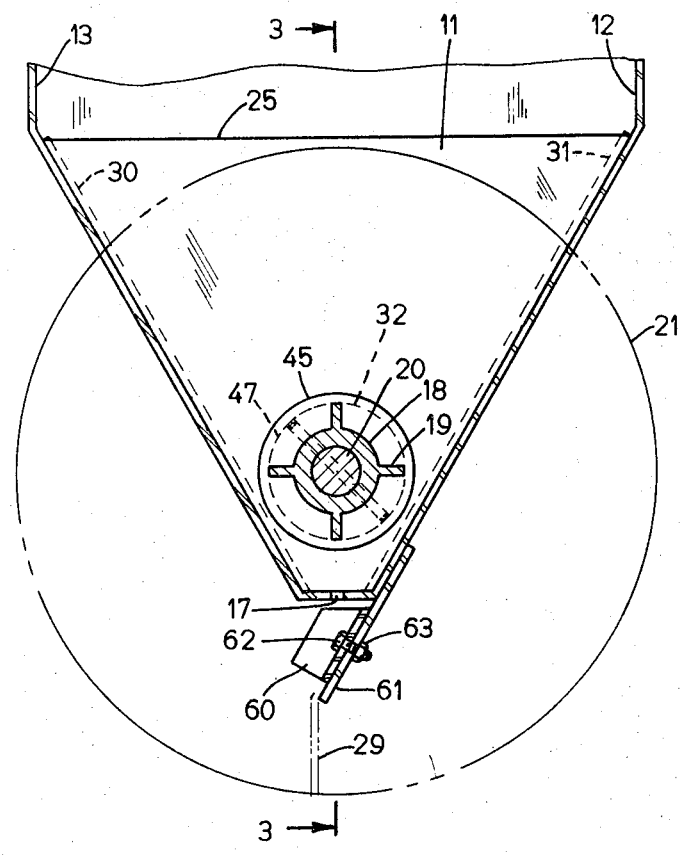
FIG. 2 is a cross-section view taken on line 2—2 of FIG. 1.
Figure 3:
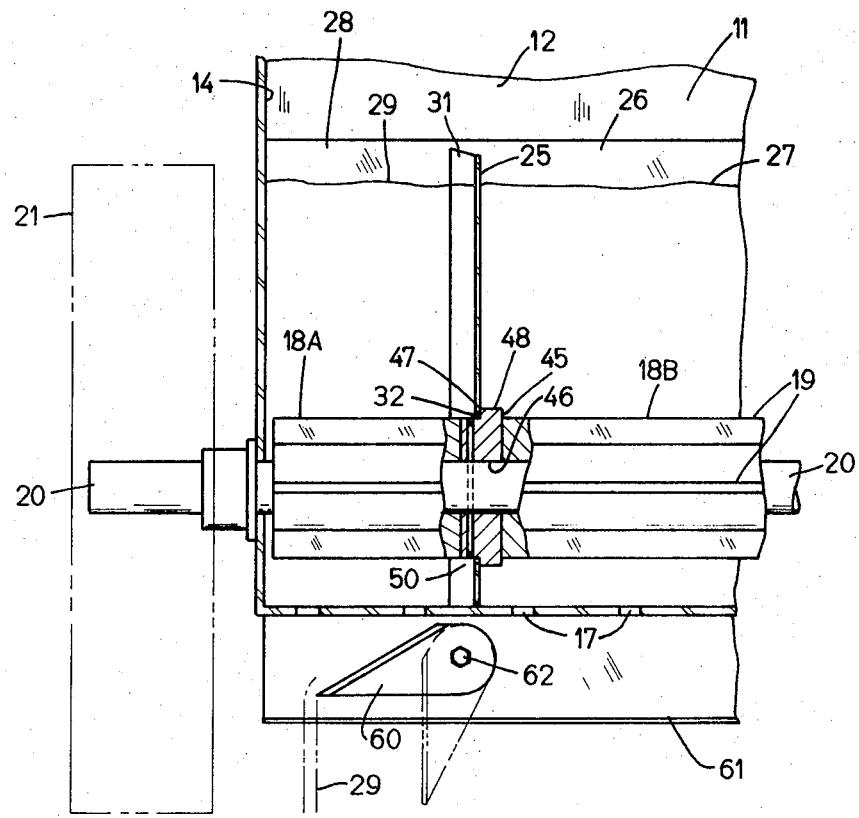
FIG. 3 is a cross-section view taken on line 3—3 of FIG. 2.
Figure 4:
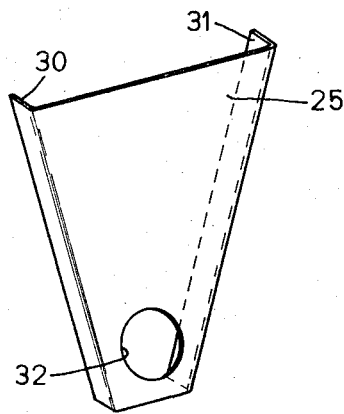
FIG. 4 is an enlarged isometric view of the separator partition shown in FIGS. 1, 2 and 3.

Referring to FIG. 1, there is shown a spreader 10 for granular materials such as fertilizer, weed killer, or seed in accordance with one embodiment of the invention. Spreader 10 comprises a downwardly tapered bin 11 having side walls 12 and 13, end walls 14 and 15, and an adjustable aperture plate 16 having a row of apertures 17 at the bottom of the bin. A rotatable impeller 18, having a plurality of blades 19, is located in bin 11 above the apertures 17 and is fixed to an impeller shaft 20 which is driven by the spreader wheels 21 to force material through the apertures 17 as the impeller rotates. A divider partition 25, also shown in FIGS. 2, 3 and 4, is mounted in bin 11 transverse to the axis of impeller 18 to divide the bin into a large compartment 26 for the material 27 to be spread and a small compartment 28 for marker material 29, such as powdered limestone. The divider partition 25 is fabricated of a single piece of sheet metal, preferably having flanges 30 and 31, and is provided with a hole 32 to accommodate the impeller 18. Divider partition 25 is welded, riveted, screwed, or otherwise secured (as by adhesives) by its flanges 30 and 31 to the inside of side walls 12 and 13 of bin 11.

Figure 6:
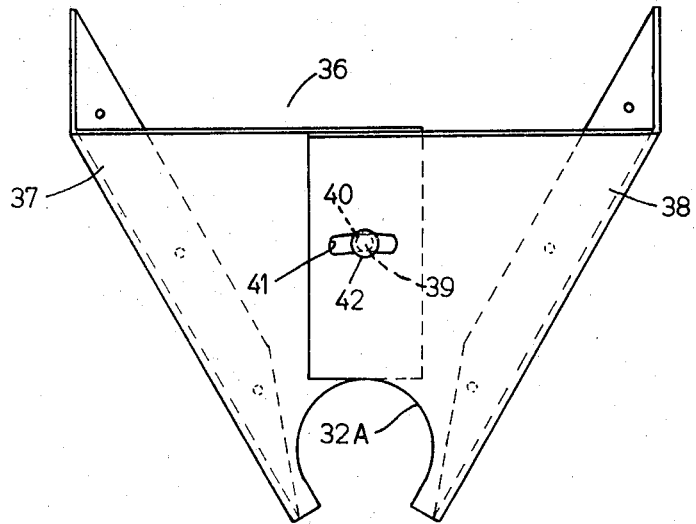
FIG. 6 is an enlarged isometric view, similar to FIG. 4, of another type of separator partition in accordance with another embodiment of the invention.

In accordance with another embodiment, as FIG. 6 shows, a divider partition 36 comprising two separate overlapping members or pieces of sheet metal 37 and 38 releasably secured together by a nut 42 and bolt 39 may be used instead of divider 25 and is adaptable to fit inside the bin of an existing spreader. Bolt 39 extends through a circular hole 40 in member 37 and through a slot 41 in member 38. Releasing or loosening of nut 42 allows the members 37 and 38 to be adjusted to the interior shape of a particular spreader bin. Partition 36 comprises a hole 32A.

Sealing means, in the form of a circular disc 45, are provided on impeller 18 to substantially close or seal the hole 32 in divider partition 25 to prevent passage of marker material 29 from compartment 28 into compartment 26 containing the material 27.

Figure 5:
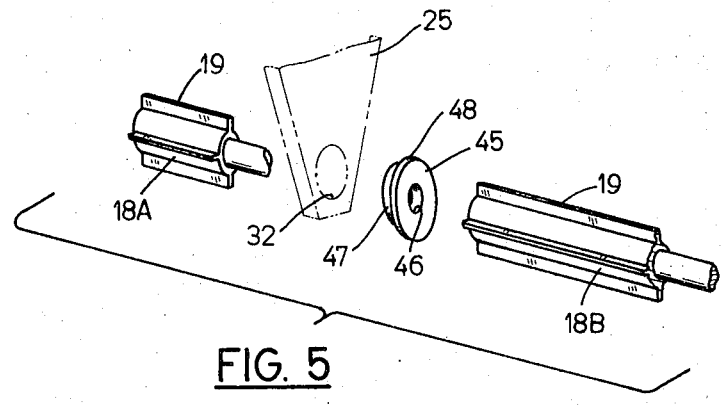
FIG. 5 is an enlarged isometric exploded view of the partition impeller and sealing means shown in FIGS. 1, 2, 3 and 4.

As FIGS. 2, 3 and 5 show, circular disc 45 has a central opening 46 to adapt it to be mounted on shaft 20 of impeller 18 and has a first portion 47 of slightly less diameter than partition hole 32 and an integral second portion or flange 48 of slightly greater diameter than partition hole 32 so as to provide a double seal against flow of marker material 29. Sealing disc 45 is a one-piece member, fabricated of metal, plastic or close-grained hardwood, and is rigidly or rotatably mounted on impeller shaft 20 during manufacture in a space 50 between the ends of two separate impeller sections 18A and 18B.

Figure 7:
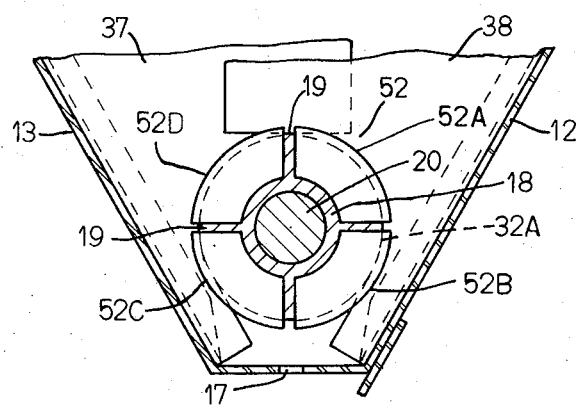
FIG. 7 is an enlarged cross-section view of another type of sealing means in accordance with another embodiment of the invention.

In accordance with another embodiment of the invention, as FIG. 7 shows, instead of disc 45, a sealing means in the form of a multi-segmented member 52 having segments 52A, 52B, 52C, and 52D may be employed with each segment secured between adjacent pairs of impeller blades by suitable means, such as adhesive. Member 52 does not require separated impeller sections such as 18A and 18B and may be applied to a spreader during or after manufacture. An adjustably movable guide chute 60 is attached to a flange or lip 61 on the outside of side 12 of bin 11 to guide the flow of marker material 29 by a bolt 62 and nut 63 and may be swung into or out of operating position, as shown in phantom in FIG. 3. Guide chute 60 serves to direct the marker material 29 being discharged from several apertures 17 in several streams into a single stream for sharply defining a marker line on the surface on which spreader 10 is being used.

RESUME

A spreader 10 for granular materials such as fertilizer, weed killer, or seed comprises a downwardly tapered bin 11 having a row of adjustable apertures 17 at the bottom of the bin and a bladed impeller 18 in the bin above the apertures 17 having blades 19 fixed to a shaft 20 driven by the spreader wheels to force material through the apertures 17 as the impeller 18 rotates. A single piece divider partition 25 is mounted in bin 11 transverse to the impeller axis to divide the bin into a large compartment 26 for the material 27 to be spread and a small compartment 28 for marker material 29 such as powdered limestone. An adjustable divider partition 36, comprising two members 37 and 38, may be used instead of divider 25. Each divider partition 25 or 36 is provided with a hole 32 to accommodate the impeller 18. Sealing means are provided on impeller 18 to close the hole 32 in the divider partition. The sealing means may take the form of single flanged disc 45 fixed or rotatable on impeller shaft 20. Or, it may take the form of a multi-segmented member 52 having segments 52A, 52B, 52C and 52D glued or otherwise secured between the impeller blades 19. An adjustably movable guide chute 60 is attached to a bracket 61 on the outside of bin 11 to guide and concentrate the flow of marking material 29.

I claim:

1. In a spreader for dispensing granular material and a powdered marker material:

A bin having a row of apertures at the bottom therof, a rotatable bladed impeller in said bin above said row of apertures, a divider partition in said bin transverse to the axis of said impeller for dividing said bin into separate compartments for said granular material and said marker material, said partition having a hole therein for accommodating said impeller, sealing means on said impeller at the location of said hole in said partition for preventing flow of marker material from its compartment to the other compartment and marker material guide means mounted on the outside of said bin below said apertures of said compartment for said marker material in a position for receiving a plurality of streams of marker material from apertures in said bin and for directing said stream into a single stream for deposit on the surface on which said spreader operates.

2. A spreader according to claim 1 wherein said bin is provided with a bracket on the exterior therof, wherein said guide means comprises a pivotally movable deflecting member movable between said position and another position clear of said plurality of streams, and including releasable attachment means for securing said deflecting member to said bracket in either of said positions.

3. In a spreader for dispensing granular material and a powdered marker material:

a bin having a row of apertures at the bottom thereof, a rotatable bladed impeller in said bin above said row of apertures and comprising a plurality of spaced apart blades, a divider partition in said bin transverse to the axis of said impeller for dividing said bin into separate compartments for said granular material and said marker material, said partition having a hole therein for accommodating said impeller, and sealing means on said impeller at the location of said hole in said partition for preventing flow of marker material from its compartment to the other compartment, said sealing means comprising a plurality of segments, each segment being rigidly secured between a pair of adjacent blades.

4. A spreader according to claim 3 wherein said segments cooperate to provide a disc having a first portion of slightly smaller diameter than said hole in said partition and a second portion of greater diameter than said hole, said first portion being disposed in said hole and said second portion being disposed adjacent said partition.

5. In a spreader for dispensing granular material and a powdered marker material:

a bin having a row of apertures at the bottom thereof, a rotatable bladed impeller in said bin above said row of apertures, sealing means on said impeller at a location intermediate the ends thereof and comprising a first portion of one diameter and a second portion of larger diameter than said first portion, an adjustable divider partition in said bin transverse to the axis of said impeller for dividing said bin into separate compartments for said granular material and said marker material, said partition comprising two relatively movable overlapping members cooperating to define a hole for accommodating said first portion of said sealing means on said impeller, said sealing means on said impeller preventing flow of marker material from its compartment to the other compartment and releasable attachment means for securing said overlapping members together.

6. A spreader according to claim 5 wherein each of said members is provided with a flange which adapts it to be secured to a side of said bin.

* * * * *